United States Patent
Childress

(10) Patent No.: US 12,463,642 B2
(45) Date of Patent: Nov. 4, 2025

(54) TOUCHLESS SENSOR SYSTEMS AND METHODS

(71) Applicant: THE BOEING COMPANY, Chicago, IL (US)

(72) Inventor: Jamie J. Childress, Mercer Island, WA (US)

(73) Assignee: The Boeing Company, Arlington, VA (US)

( * ) Notice: Subject to any disclaimer, the term of this patent is extended or adjusted under 35 U.S.C. 154(b) by 1093 days.

(21) Appl. No.: 17/468,985

(22) Filed: Sep. 8, 2021

(65) Prior Publication Data

US 2023/0074347 A1    Mar. 9, 2023

(51) Int. Cl.
| | | |
|---|---|---|
| H03K 17/94 | (2006.01) | |
| G01B 21/18 | (2006.01) | |
| G01D 5/40 | (2006.01) | |
| G06V 10/40 | (2022.01) | |
| G06V 40/10 | (2022.01) | |

(52) U.S. Cl.
CPC .......... *H03K 17/943* (2013.01); *G01B 21/18* (2013.01); *G01D 5/40* (2013.01); *G06V 10/40* (2022.01); *G06V 40/107* (2022.01)

(58) Field of Classification Search
CPC ........ H03K 17/943; G01B 21/18; G01D 5/40; G06V 10/40; G06V 40/107
See application file for complete search history.

(56) References Cited

U.S. PATENT DOCUMENTS

| 4,497,982 A | * | 2/1985 | Michalski | .............. | H01H 13/70 |
| | | | | | 200/512 |
| 2007/0086626 A1 | * | 4/2007 | Mariani | .............. | G06V 40/161 |
| | | | | | 382/115 |

FOREIGN PATENT DOCUMENTS

| CN | 112875450 | | 6/2021 | | |
| CN | 112875450 A | * | 6/2021 | .............. | B66B 1/46 |
| EP | 2676913 | | 12/2013 | | |
| WO | WO 2012/088549 | | 6/2012 | | |
| WO | WO 2013/033735 | | 3/2013 | | |

OTHER PUBLICATIONS

Extended European Search Report for EP 22194136.2-1211, dated Jan. 16, 2023.

* cited by examiner

*Primary Examiner* — Michael W Choi
(74) *Attorney, Agent, or Firm* — Joseph M. Butscher; The Small Patent Law Group LLC

(57) ABSTRACT

A sensor system is configured to control one or more operational functions of one or more components. The sensor system includes one or more protuberances, a first channel defined by the one or more protuberances, a second channel defined by the one or more protuberances, and one or more sensing devices configured to detect one or more actions of an object in relation to one or more of the one or more protuberances, the first channel, or the second channel. The one or more actions of the object are associated with the one or more operational functions of the one or more components.

20 Claims, 10 Drawing Sheets

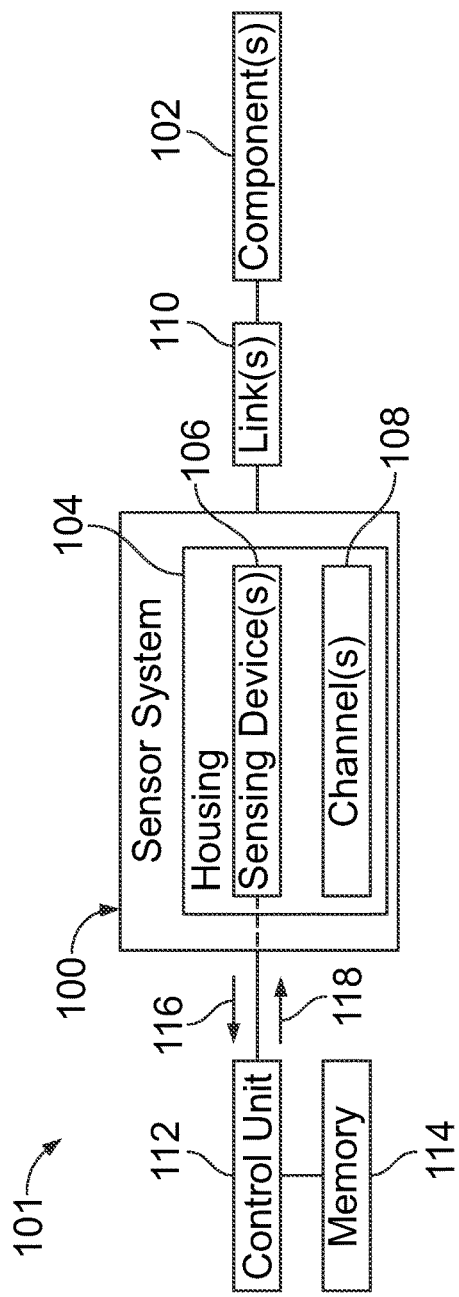
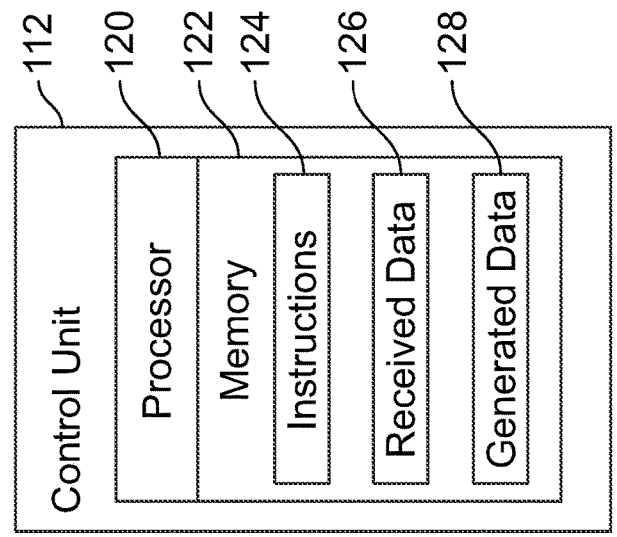

TOUCHLESS SENSOR SYSTEMS AND METHODS

FIELD OF THE DISCLOSURE

Examples of the present disclosure generally relate to touchless sensor systems and methods, such as can be used to operate various components.

BACKGROUND OF THE DISCLOSURE

Touchless sensors have been used in conjunction with various components. For example, certain stowage bins onboard commercial aircraft include touchless latches that allow individuals to open and close the stowage bins without touching any portion of the stowage bins. Instead, a swipe of a hand in proximity to a touchless latch opens a stowage bin, for example.

However, certain known touchless sensors do not always reliably trigger an operation. Further, touchless sensors can be inadvertently activated, such as by an individual passing thereby. Moreover, certain known touchless sensors typically only have a single function, such as activating or deactivating a component.

SUMMARY OF THE DISCLOSURE

A need exists for an effective and reliable touchless sensor. Further, a need exists for a touchless sensor that is less susceptible to inadvertent triggering. Also, a need exists for a touchless sensor that can be used to operate different modes or functions.

With those needs in mind, certain examples of the present disclosure provide a sensor system configured to control one or more operational functions of one or more components. The sensor system includes one or more protuberances, a first channel defined by the one or more protuberances, a second channel defined by the one or more protuberances, and one or more sensing devices configured to detect one or more actions of an object in relation to one or more of the one or more protuberances, the first channel, or the second channel. The one or more actions of the object are associated with the one or more operational functions of the one or more components.

In at least one example, the one or more sensing devices include an infrared emitter having at least a portion on the one or more protuberances, and an infrared receiver having at least a portion on the one or more protuberances.

In at least one example, the one or more sensing devices include a camera. The camera can be further configured to detect one or more distinguishable features of an individual.

In at least one example, the first channel intersects the second channel. In at least one example, the first channel is orthogonal to the second channel.

In at least one example, the object is a finger, and the first channel and the second channel are sized and shaped to receive the finger.

In at least one example, the one or more protuberances include four protuberances. The first channel and the second channel are defined between the four protuberances.

The sensor system can be mounted on a structure, integrally formed with a structure, and/or have at least a portion outwardly extending from a surface of a structure.

In at least one example, the sensor system also includes one or more object depth sensors.

The one or more components can include one or more of a lock, a handle, a light switch, a latch, or a flush button of a toilet.

Certain examples of the present disclosure provide a method of controlling one or more operational functions of one or more components. The method includes detecting, by one or more sensing devices, one or more actions of an object in relation to one or more of one or more protuberances, a first channel defined by the one or more protuberances, or a second channel defined by the one or more protuberances; and associating, by a control unit, the one or more actions of the object with the one or more operational functions of the one or more components.

Certain examples of the present disclosure provide a system including one or more components, and a sensor system configured to control one or more operational functions of the one or more components. The sensor system includes four protuberances, a first channel defined by at least a first portion of the four protuberances, a second channel defined by at least a second portion of the four protuberances, and one or more sensing devices configured to detect actions of an object in relation to the four protuberances, the first channel, and the second channel. The actions of the object are associated with the one or more operational functions of the one or more components.

BRIEF DESCRIPTION OF THE DRAWINGS

FIG. 1 illustrates a schematic block diagram of a sensor system coupled to one or more components, according to an example of the present disclosure.

FIG. 2 illustrates a schematic block diagram of a control unit, according to an example of the present disclosure.

DETAILED DESCRIPTION OF THE DISCLOSURE

Figure 3:
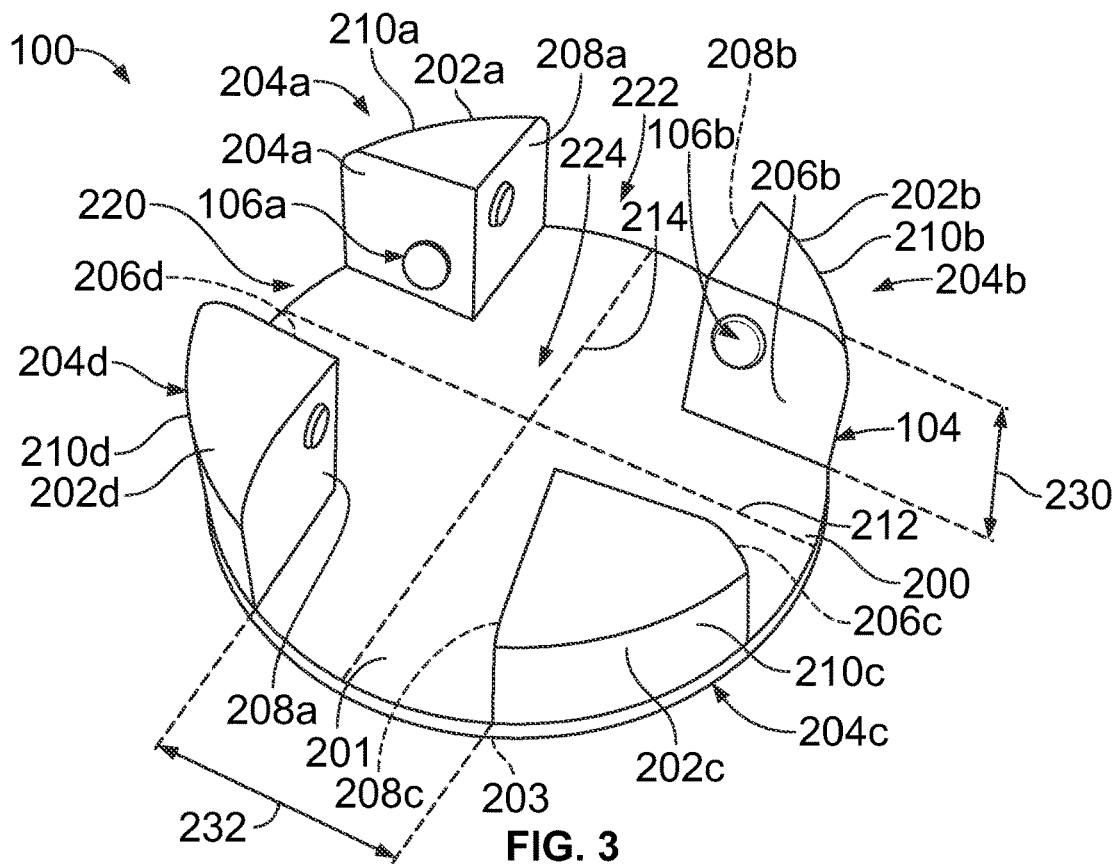
FIG. 3 illustrates a perspective top view of a sensor system, according to an example of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide touchless sensor systems and methods. In at least one embodiment, the sensors systems and methods include multiple send-receive units that can be interrupted by a finger, for example. The systems and methods include a housing that prevents or reduces a potential of accidental interrupts. The housing also is configured to allow swiping (such as via a finger or hand) in multiple directions. Swiping in multiple directions allows for multiple commands to be given via a single touchless sensor system. The systems and methods are configured to be fault resistant, thereby reducing a potential of inadvertent engagement. Further, because the systems and methods are configured for touchless operation, the systems and methods eliminate or otherwise reduce a possibility of contact with germs, bacteria, viruses, or other pathogens that may be present on surfaces thereof.

In at least one embodiment, a triggering object, such as a finger or hand, is small enough to fit inside channels of the housing. The channels can be valleys defined between protuberances, such as columns, posts, knobs, or the like. In at least one embodiment, a triggering action can require swiping a finger through at least two channels. The triggering action can include complex swipe patterns or simple swipe patterns as appropriate for application.

The sensor systems and methods can be used to operate one or more components, such as locks, latches, doors, stowage bins, lights, cabinets, heating, ventilation, and air conditioning (HVAS) controls (such as electronic thermostats), toilets, faucets, or the like. The components listed are merely examples. The sensor systems and methods can be used with various other components.

FIG. 1 illustrates a schematic block diagram of a sensor system 100 coupled to one or more components 102, according to an example of the present disclosure. FIG. 1 shows a system 101 including the sensor system, the one or more components 102. Examples of the components 102 includes, but at not limited to, locks, latches, doors, stowage bins, lights, cabinets, heating, ventilation, and air conditioning (HVAS) controls (such as electronic thermostats), toilets, faucets, or the like. The sensor system 100 is configured to control operation of at least one operational function of one or more of the components. In at least one embodiment, the sensor system 100 is configured to control operation of multiple functions of a component 102. As another example, the sensor system 100 is configured to control operation of at least one function of multiple components 102. As another example, the sensor system 100 is configured to control operation of multiple functions of multiple components 102.

The sensor system 100 includes a housing 104 having one or more sensing devices 106 and one or more channels 108. In at least one embodiment, the sensing devices 106 include at least one infrared emitter and at least one infrared receiver. As another example, the sensing devices 106 can include other optical devices, such as one or more cameras (photographic or video). As another example, the sensing devices 106 can include one or more ultrasonic transducers. As another example, the sensing devices 106 can be lasers. As another example, the sensing devices 106 can include one or more visible light emitters and receivers.

The channel(s) 108 are defined within the housing 104, such as between one or more protuberances, such as columns, posts, walls, knobs, and/or the like. In at least one example, the housing 104 includes a first channel that intersects a second channel. The first channel can be orthogonal to the second channel. For example, the first channel is with an X-axis, and the second channel is parallel to a Y-axis. Optionally, the housing 104 can include more than two channels.

The channels 108 are sized and shaped to allow an object to pass therein and/or through without touching (if so desired by an individual) any portion of the housing 104. The housing 104 can be touched, if so desired, but the channels 108 are sized and shaped to allow an object to pass therein and/or through without touching any portion of the housing 104. In at least one embodiment, the object is a finger of an individual. As another example, the object is a hand of an individual. As another example, the object is a stylus, pen, stick, or the like held by an individual.

The sensor system 100 is coupled to the component(s) 102 through one or more links 110. In at least one embodiment, the link(s) 110 includes a mechanical connection, such as a plunger, latch, wheel, gears, chain, cable, and/or the like. In at least one embodiment, the link(s) 110 includes a wireless or wired electrical connection. In at least one embodiment, the link(s) 110 includes a mechanical and wired or wireless electrical connection.

In at least one embodiment, the sensor system 100 is also in communication with a control unit 112, such as through one or more wired or wireless connections. The control unit 112 is in communication with a memory 114, such as through one or more wired or wireless connections. Optionally, the control unit 112 includes the memory 114. As shown, the control unit 112 and the memory 114 can be separate and distinct from the sensor system 100. Optionally, the control unit 112 and the memory 114 can be integral parts of the sensor system 100. For example, the control unit 112 and the memory 114 can be contained within the housing 104.

The control unit 112 is configured to control operation of the component(s) 102 based on one or more actions detects by the sensing device 106. As such, the control unit 112 can be in communication with the component(s) 102 and/or the link(s) 110 to control operation thereof in response to the action(s) detected by the sensing device 106.

In operation, an action of an object, such as a finger of an individual, is performed in relation to the one or more channels 108. The action can be the object passing into and/or through the channel(s) 108, passing an object, such as a finger, into and/or through the channel(s) 108, circling around one or more protuberances that define the channel(s), and/or the like. The memory 114 stores data regarding functions of the component(s) 102 associated with one or more actions.

The sensing device(s) 106 detect the action, and output an action signal 116 to the control unit 112 regarding the detected action. In response to receiving the action signal 116 that includes the information regarding the detected action, the control unit 112 compares the detected action with the data stored in the memory regarding the operational function of the component(s) 102 associated with the detected action. The control unit 112 then outputs an operational signal 118 that causes one or both of the link(s) 110 and/or the component(s) 102 to operate the component(s) 102 according to the operational function.

As described herein, the sensor system 100 is configured to control one or more operational functions of the one or more components 102. The sensor system 100 includes one or more protuberances, a first channel defined by the one or more protuberances, a second channel defined by the one or more protuberances, and one or more sensing devices 106 configured to detect one or more actions of an object in relation to one or more of the one or more protuberances, the first channel, or the second channel. The one or more actions of the object are associated with the one or more operational functions of the one or more components.

FIG. 2 illustrates a schematic block diagram of the control unit 112, according to an example of the subject disclosure. In at least one example, the control unit 112 includes at least one processor 120 in communication with a memory 122 (such as the memory 114 shown in FIG. 1 or a different memory). The memory 122 stores instructions 124, received data 126, and generated data 128. The control unit 112 shown in FIG. 2 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 112 may be or include one or more processors that are configured to control operation, as described herein.

The control unit 112 is configured to execute a set of instructions that are stored in one or more data storage units or elements (such as one or more memories), in order to process data. For example, the control unit 112 may include or be coupled to one or more memories. The data storage units may also store data or other information as desired or needed. The data storage units may be in the form of an information source or a physical memory element within a processing machine.

The set of instructions may include various commands that instruct the control unit 112 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 112. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 112 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

FIG. 3 illustrates a perspective top view of a sensor system 100, according to an example of the present disclosure. The sensor system 100 includes a housing 104, which includes a base 200, such as a panel, surface of a structure, wall, and/or the like. A plurality of protuberances 202a, 202b, 202c, and 202d extend from a first surface 201 of the base 200. The first surface 201 is opposite from a second surface 203. For example, the first surface 201 is a front surface, and the second surface 203 is a rear surface. As another example, the first surface 201 is a top surface, and the second surface is a bottom surface.

The protuberances 202a-d are columns, posts, knobs, or the like. The protuberance 202a (for example, a first protuberance) includes a body 204a having a first interior wall 206a, a second interior wall 208a, and an exterior wall 210a. In at least one example, the first interior wall 206a is orthogonal to the second interior wall 208a. For example, the first interior wall 206a is parallel to a first axis 212 (such as an X-axis) of the housing 104, and the second interior wall 208a is parallel to a second axis 214 (such as Y-axis) of the housing 104. The first axis 212 is orthogonal to the second axis 214. Alternatively, the first interior wall 206a may be angled or curved in relation to (but not orthogonal) the second interior wall 208b. The exterior wall 210a can be sized and shaped to conform to an exterior profile of the base 200. Optionally, the protuberance 202a may not include the exterior wall 210a.

The protuberance 202b (for example, a second protuberance) includes a body 204b having a first interior wall 206b, a second interior wall 208b, and an exterior wall 210b. The first interior wall 206b is orthogonal to the second interior wall 208b. For example, the first interior wall 206b is parallel to the first axis 212 (such as an X-axis) of the housing 104, and the second interior wall 208b is parallel to the second axis 214 (such as Y-axis) of the housing 104. Alternatively, the first interior wall 206b may be angled or curved in relation to (but not orthogonal) the second interior wall 208b. The exterior wall 210b can be sized and shaped to conform to an exterior profile of the base 200. Optionally, the protuberance 202b may not include the exterior wall 210b.

The protuberance 202c (for example, a third protuberance) includes a body 204c having a first interior wall 206c, a second interior wall 208c, and an exterior wall 210c. The first interior wall 206c is orthogonal to the second interior wall 208c. For example, the first interior wall 206c is parallel to the first axis 212 (such as an X-axis) of the housing 104, and the second interior wall 208c is parallel to the second axis 214 (such as Y-axis) of the housing 104. Alternatively, the first interior wall 206c may be angled or curved in relation to (but not orthogonal) the second interior wall 208c. The exterior wall 210c can be sized and shaped to conform to an exterior profile of the base 200. Optionally, the protuberance 202c may not include the exterior wall 210c.

The protuberance 202d (for example, a fourth protuberance) includes a body 204d having a first interior wall 206d, a second interior wall 208d, and an exterior wall 210d. The first interior wall 206d is orthogonal to the second interior wall 208d. For example, the first interior wall 206d is parallel to the first axis 212 (such as an X-axis) of the housing 104, and the second interior wall 208d is parallel to the second axis 214 (such as Y-axis) of the housing 104. Alternatively, the first interior wall 206d may be angled or curved in relation to (but not orthogonal) the second interior wall 208d. The exterior wall 210d can be sized and shaped to conform to an exterior profile of the base 200. Optionally, the protuberance 202d may not include the exterior wall 210d.

The protuberances 202a-d define a first channel 220 and a second channel 222 therebetween. The first channel 220 is parallel to (and can be coaxially aligned with) the first axis 212, and the second channel 222 is parallel to (and can be coaxially aligned with) the second axis 214. As such, in at least one embodiment, the first channel 220 is orthogonal to the second channel 222. The first channel 220 intersects the second channel 222, such as at a center 224 of the housing 104. The first channel 220 extends between the first interior walls 206a, 206b, 206c, and 206d. The second channel 222 extends between the second interior walls 208a, 208b, 208c, and 208d.

The protuberances 202a-d are sized and shaped to define the first channel 220 and the second channel 222 at a desired height 230 and width 232. The height 230 and width 232 of each of the first channel 220 and the second channel 222 are sized and shaped to allow for insertion and passage of an object, such as a finger or hand, for example. For example, the height 230 of each of the first channel 220 and the second channel 222 can be between 1-2 inches, and the width 232 of each of the first channel 220 and the second channel 222 can be between 1-2 inches. Heights 230 and widths 232 that do not exceed 2 inches allow for a finger to pass into the channels 220 and 222, while blocking larger objects (such as forearms, elbows, or the like) from passing therein (and which could otherwise cause inadvertent triggering of the sensor system 100). Optionally, the heights 230 and widths 232 of the first channel 220 and the second channel 222 can be less than 1 inch, or greater than 2 inches, as desired.

One or both of the first channel 220 and/or the second channel 222 can have a uniform height and uniform width over a length thereof. Optionally, the height and/or width of one or both of the first channel 220 and/or the second channel 222 can vary over a length thereof. As an example, the height (or depth) and/or width of the first channel 220 and/or the second channel 222 can be greatest at the center 224, and least at terminal ends. The height (or depth) and/or width can gradually and regularly increase from each terminal end toward the center 224.

As shown, the base 200 can be circular, and the protuberances 202a-d can include similar surfaces that conform to an envelope of the base 200. Optionally, the housing 104 can be sized and shaped differently. For example, the base 200 can be rectangular, triangular, octagonal, irregularly-shaped, and/or the like.

Figure 4:
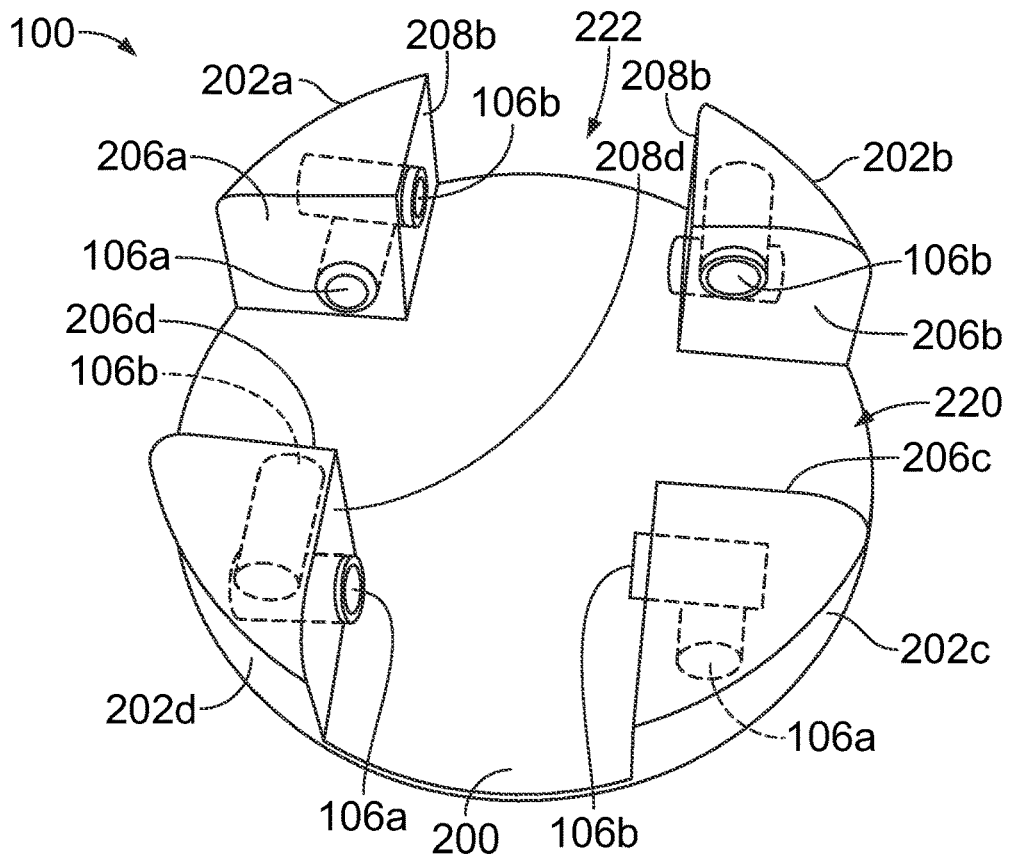
FIG. 4 illustrates a perspective top view of the sensor system of FIG. 3 with protuberances shown transparent.

FIG. 4 illustrates a perspective top view of the sensor system 100 of FIG. 3 with protuberances shown transparent. Referring to FIGS. 1, 3, and 4, each protuberance 202a-202d includes at least one sensing device 106. For example, the protuberance 202a includes an infrared (IR) emitter 106a having a portion on the first interior wall 206a configured to emit an IR beam into the first channel 220 toward an IR receiver 106b having at least a portion on the interior wall 206d of the protuberance 202d. The protuberance 202b includes an IR emitter 106a on at least a portion of the interior wall 208b configured to emit an IR beam into the second channel 222 toward an IR receiver 106b having at least a portion on the interior wall 208a of the protuberance 202a. The protuberance 202c includes an IR emitter 106a on at least a portion of the interior wall 206a configured to emit an IR beam into the first channel 220 toward an IR receiver 106b having at least a portion on the interior wall 206b of the protuberance 202b. The protuberance 202d includes an IR emitter 106a on at least a portion of the interior wall 206b configured to emit an IR beam into the second channel 222 toward an IR receiver 106b having at least a portion of the interior wall 208c of the protuberance 202c.

As shown, the IR emitters 106a can be positioned below (that is, closer to the base 200) than the IR receiver 106b. The IR emitters 106a can be angled toward associated IR receivers 106b so that the IR beams can be received by the IR receivers 106b. Optionally, the IR emitters 106a can be at the same height as the IR receiver 106b. Also, optionally, the IR emitters 106a can be positioned where the IR receivers 106b are shown, and vice versa.

When the IR beams output by the IR emitters 106a are received by corresponding, associated, or otherwise respective IR receivers 106b, there is no action by an object within the channels 220 or 222. That is, an unbroken IR beam is associated with no action. As such, no action signal 116 is sent to the control unit 112. In contrast, when an object is within a channel between an IR emitter 106a and a respective IR receiver 106b (for example, between the IR emitter 106a of the protuberance 202a and the IR receiver 106b of the protuberance 202d), the object interrupts (for example, blocks) the IR beam from being received by the IR receiver 106b, which corresponds to the object within a channel 220 or 222, and thus an action. As such, the IR receiver 106b outputs the action signal 116 to the control unit 112.

Figure 5:
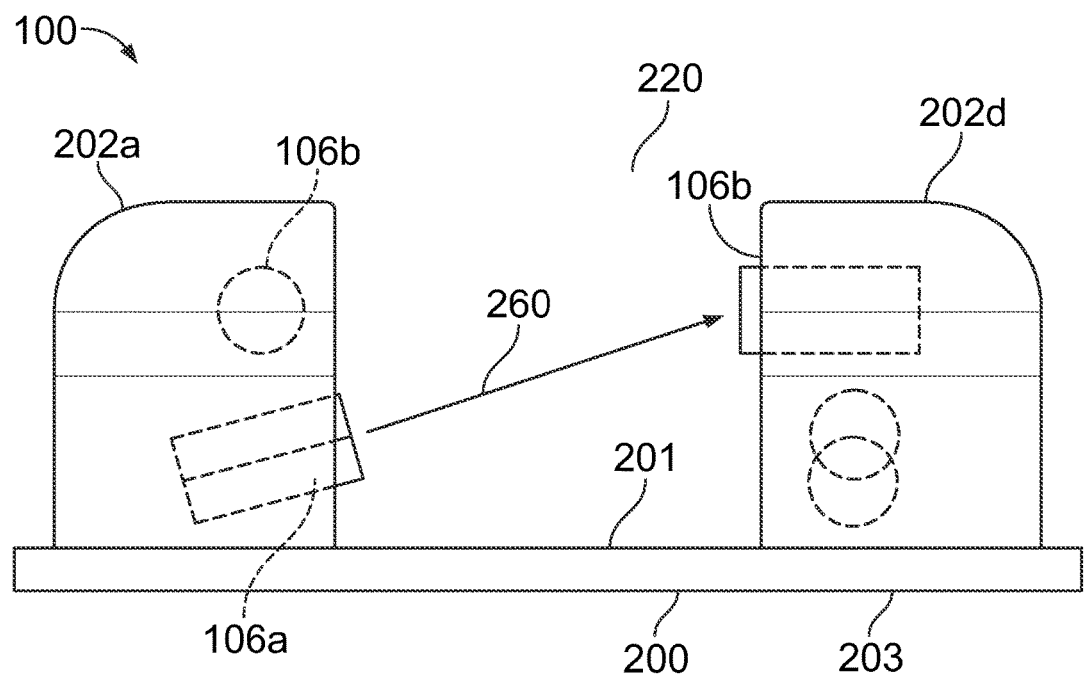
FIG. 5 illustrates a lateral view of the sensor system of FIG. 3 with protuberances shown transparent.

FIG. 5 illustrates a lateral view of the sensor system 100 of FIG. 3 with protuberances shown transparent. FIG. 5 shows the protuberance 202a in relation to the protuberance 202d, but the other protuberances can be similarly configured. As shown, the IR emitter 106a of the protuberance 202a is upwardly angled to emit an IR beam 260 through the channel 220 toward the IR receiver 106b of the protuberance 202d. Optionally, the IR emitters 106a can be at the same height as the IR receiver 106b.

The IR emitters 106a can be configured for pulse modulation coding. Optionally, the IR emitters 106a can be configured for constant, non-coded IR illumination.

Figure 6:
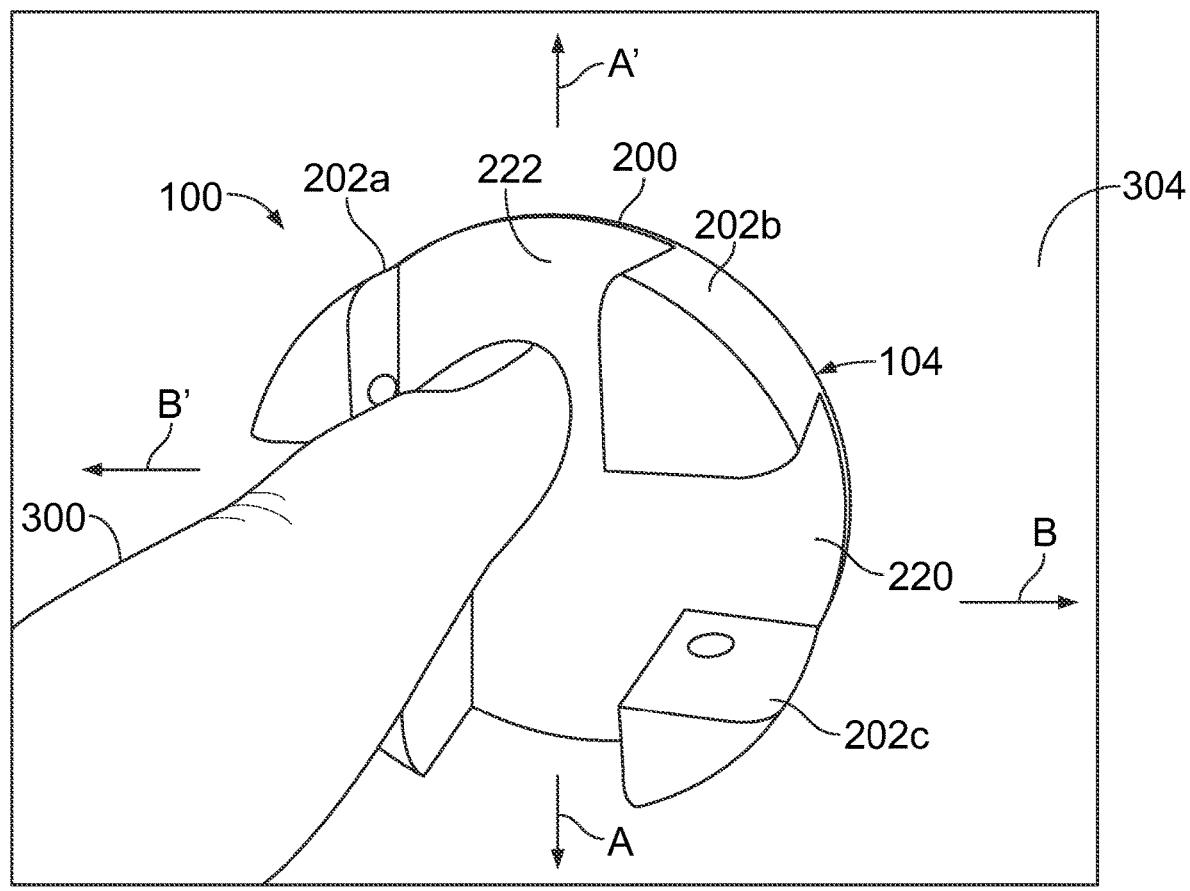
FIG. 6 illustrates a perspective view of a finger within a channel of the sensor system.

FIG. 6 illustrates a perspective view of a finger 300 within a channel 222 of the sensor system 100. The finger 300 is an example of an object that is configured to pass into the channels 220 and 222. The finger 300 performs an action within the channel 220 and/or 222, such as a downward swipe in direction A, an upward swipe in the direction A', a right swipe in the direction B, a left swipe in direction B', and/or the like. Referring to FIGS. 1-6, the protuberances 202a-d and channels 220, 222 provide locations and paths for a wide variety of potential actions, which can be recognized by the control unit 112 as corresponding to various operational functions of the component(s) 102.

Figure 7:
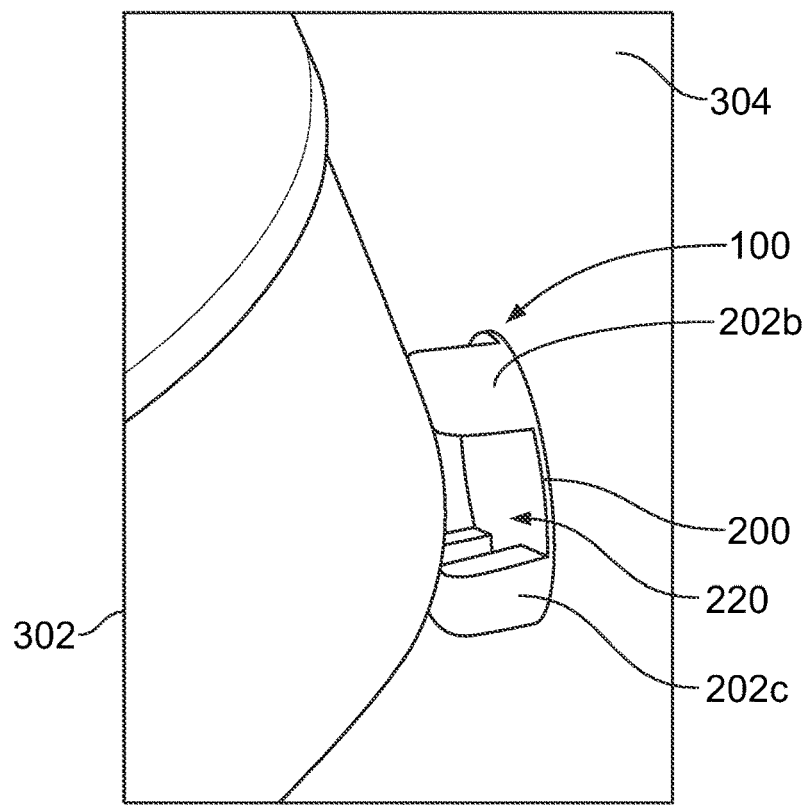
FIG. 7 illustrates a perspective side view of an arm in relation to the sensor system.

FIG. 7 illustrates a perspective side view of an arm 302 in relation to the sensor system 100. As described herein, the protuberances 202a-d are sized and shaped to allow an object of a particular size (such as the finger 300 shown in FIG. 6) to pass into the channels 220 and 222 (such as between associated IR emitters 106a and IR receivers 106b), while preventing larger objects, such as the arm 302, from passing into the channels 220 and 222. As such, the sensor system 100 prevents, minimizes, or otherwise reduces the potential of inadvertent triggering.

Referring to FIGS. 6 and 7, the sensor system 100 can be mounted to a structure 304, such as a wall, door, panel, and/or the like. For example, the second surface 203 of the base 200 (shown in FIG. 5) can be mounted onto an outer surface of the structure 304, such as through one or more fasteners, adhesives, and/or the like. Optionally, the sensor system 100 can be integrally formed with the structure.

Figure 8:
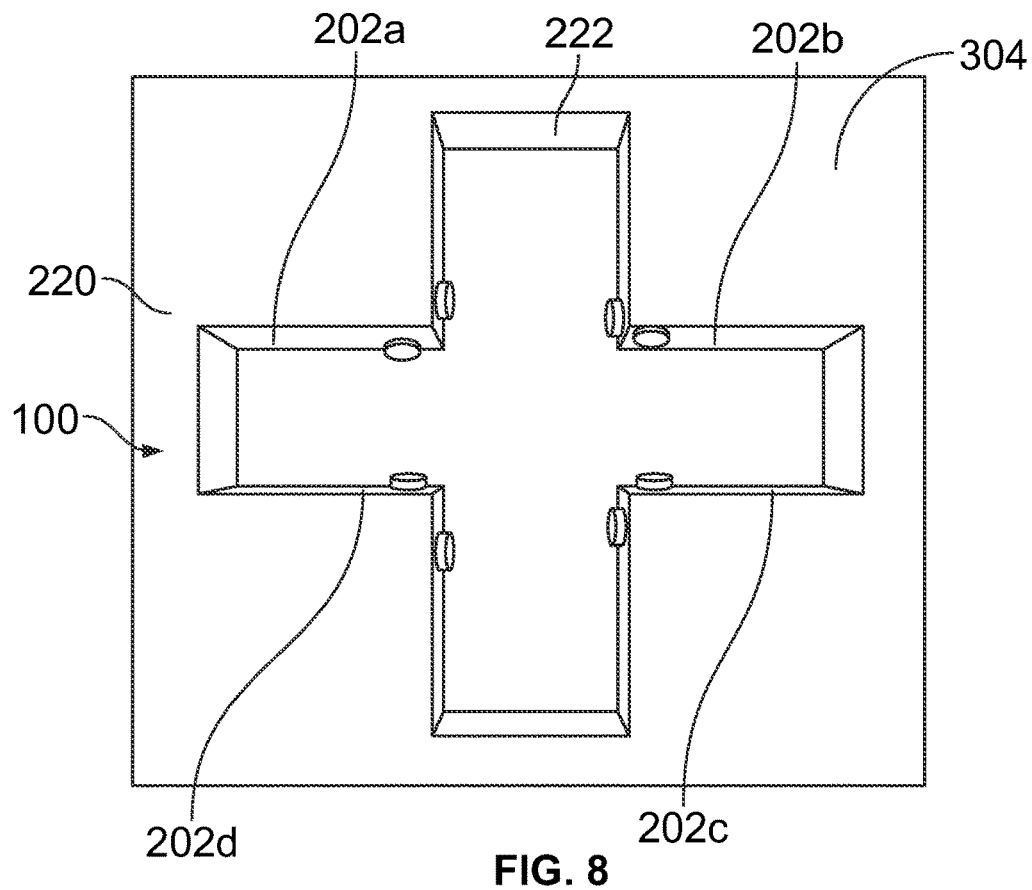
FIG. 8 illustrates a front view of a sensor system integrally formed with a structure, according to an example of the present disclosure.

FIG. 8 illustrates a front view of a sensor system 100 integrally formed with the structure 304, according to an example of the present disclosure. As shown, the channels 220 and 222 can be recessed into the structure 304. As such, there is no need for a separate and distinct base. Instead, the structure 304 itself provides a substrate for the protuberances 202a-d, which have outer front surfaces that can be flush with a surface of the structure 304.

Figure 9:
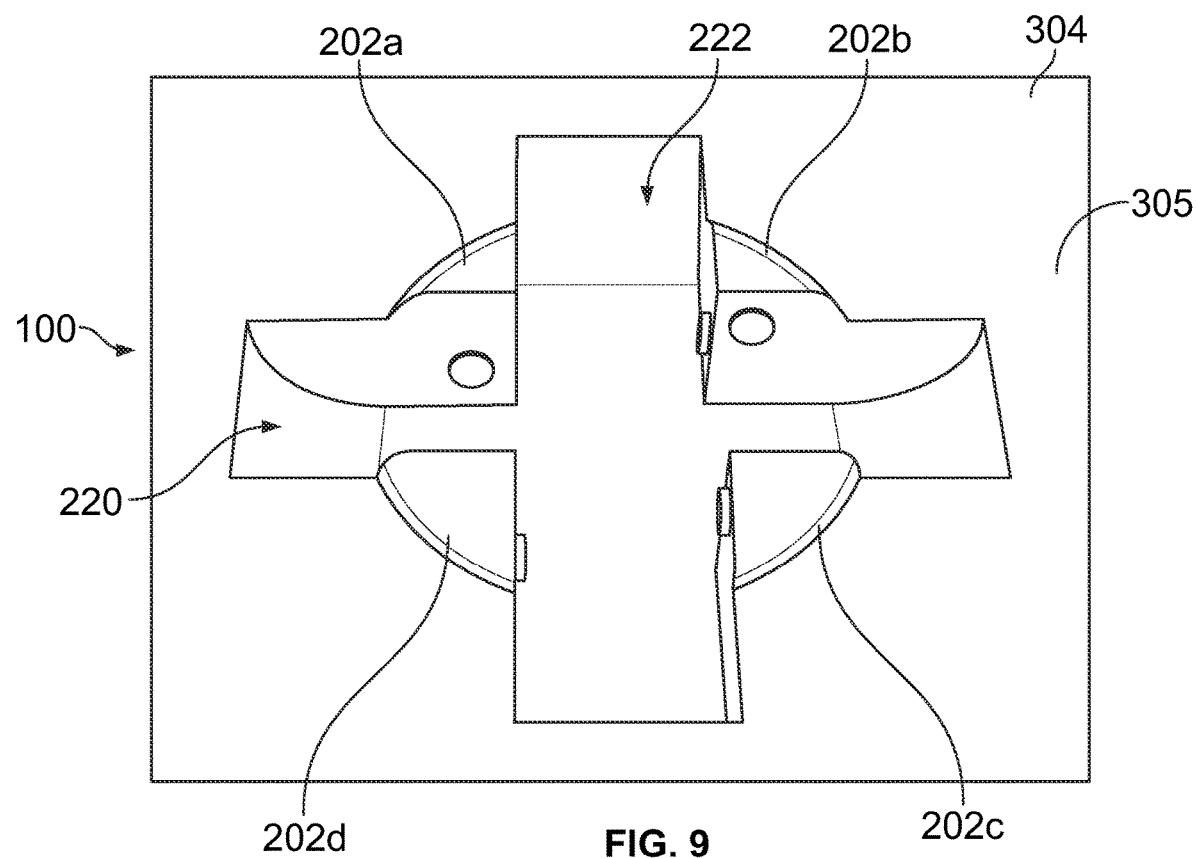
FIG. 9 illustrates a front view of a sensor system integrally formed with a structure, according to an example of the present disclosure.

FIG. 9 illustrates a front view of a sensor system 100 integrally formed with the structure 304, according to an example of the present disclosure. As shown, at least portions of the protuberances 202a-d can outwardly extend past a plane of an exterior surface 305 of the structure 304. By extending outwardly pass the exterior surface 305, the protuberances 202a-d provide increased visibility to the sensor system 100.

Figure 10:
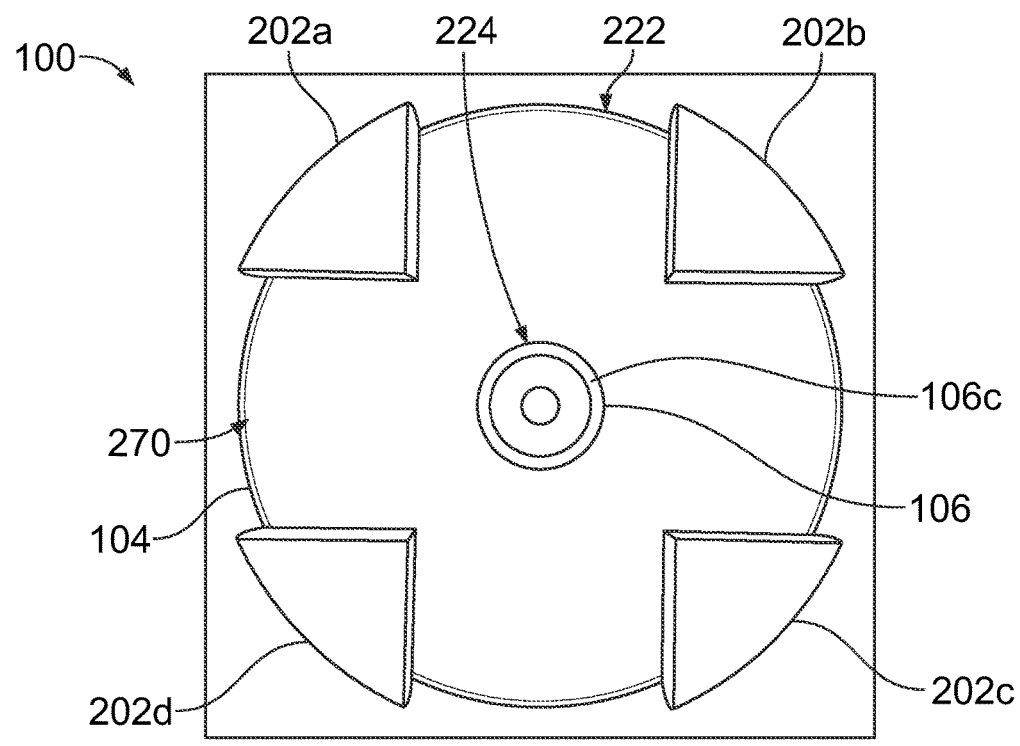
FIG. 10 illustrates a front view of a sensor system, according to an example of the present disclosure.

FIG. 10 illustrates a front view of a sensor system 100, according to an example of the present disclosure. In this embodiment, instead of having IR emitters and IR sensors on the protuberances 202a-d, the sensing device 106 is otherwise includes a camera 106c, such as at or proximate to the center 224 of the housing 104. For example, the camera 106c is at the intersection of the first channel 220 and the second channel 222. In at least one embodiment, a sensor system 100 can include the camera 106c as well as the IR emitters 106a and IR receivers 106b, such as shown in FIGS. 3-5.

The camera 106c can be a photographic camera or a video camera. In at least one embodiment, the camera 106c is a wide field of view camera. The camera 106c is configured to detect the various actions, described herein. Further, the camera 106c is able to detect distinguishable features of an individual, such as unique eye, facial, or other such features. Data regarding the distinguishable features can be stored in the memory 114 (shown in FIG. 1), and can be referenced by the control unit 112 to control operation of the component(s) 102. For example, if the component 102 is a safe, locker, or the like, and the sensor system 100 is used as a combination lock to open the safe, locker, or the like, the control unit 112 can operate to open the safe, lock, or the like in response to a particular combination of actions by an object (such as a finger), and when the distinguishable feature(s) acquired by the camera 106c matches corresponding data stored in the memory 114. As such, image recognition of distinguishable features of an individual, as acquired by the camera 106c, can be used as an enhanced, redundant security feature. In at least one other embodiment, the camera 106c is used to detect actions of an object in relation to the sensor system 100, but not to detect distinguishable features of an individual.

Figure 11:
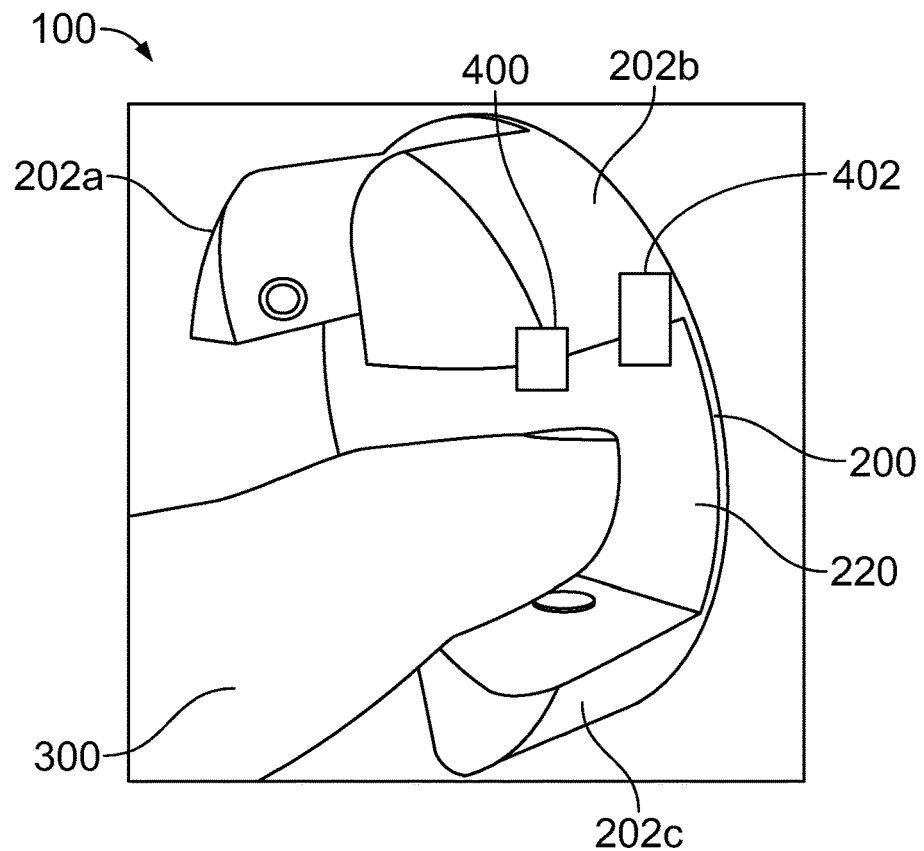
FIG. 11 illustrates a perspective lateral view of a sensor system, according to an example of the present disclosure.

FIG. 11 illustrates a perspective lateral view of a sensor system 100, according to an example of the present disclosure. The sensor system 100 can include object depth sensors 400 and 402, such as infrared sensors, ultrasonic sensors, cameras, thermal sensors, air capacitive sensors, and/or the like. The object depth sensors 400 and 402 can be disposed on one or more of the protuberances 202a-202d. The object depth sensor 400 can be further from the base 200 than the object depth sensor 402. Referring to FIGS. 1 and 11, the control unit 112 is in communication with the object depth sensors 400 and 402, such as through one or more wired or wireless connections. The control unit 112 may be configured to recognize an action only after the object depth sensor 402 has been triggered, thereby further reducing the potential of an inadvertent triggering.

As shown, the sensor system 100 can include two object depth sensors 400 and 402 on one or more of the protuberances 202a-d. Optionally, only the sensor system 100 can include only a single object depth sensor 400 or 402 on one or more of the protuberances 202a-d. The object depth sensor(s) 400 and/or 402 can be used with respect to any of the embodiments described herein.

Figure 12:
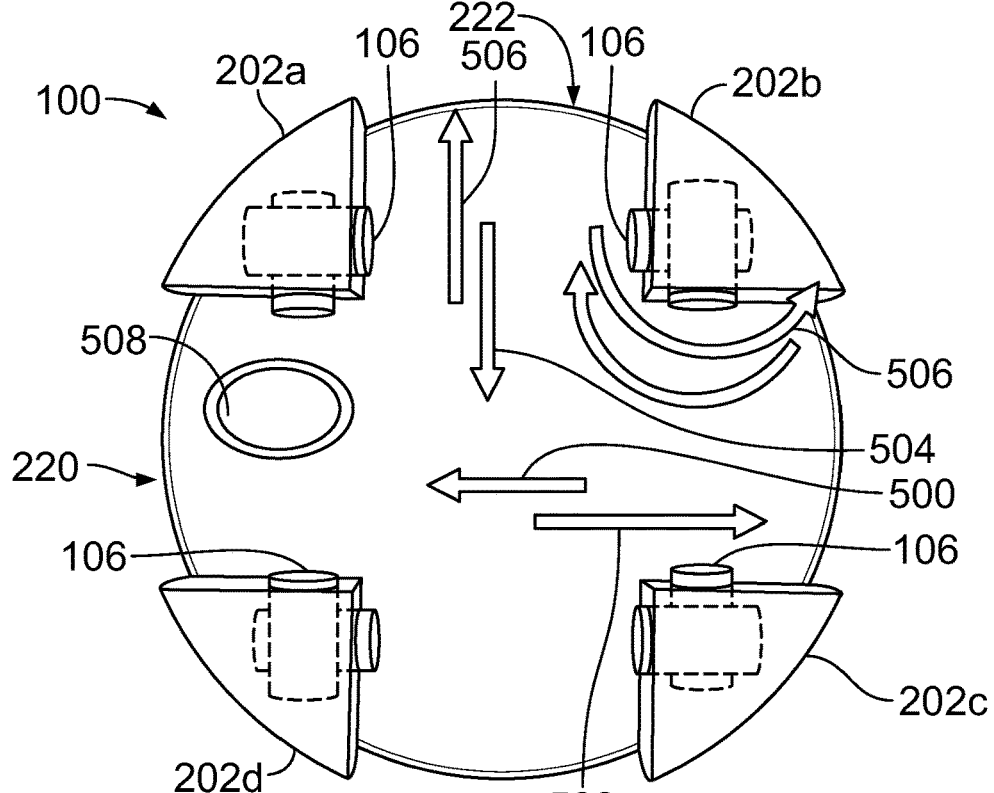
FIG. 12 illustrates a front view of a sensor system showing various actions, according to an example of the present disclosure.

FIG. 12 illustrates a front view of the sensor system 100 showing various actions, according to an example of the present disclosure. The protuberances 202a-d and channels 220, 222 provide locations and pathways for a wide variety of actions performed by an object, such as a finger. Each of the actions can be associated with a different function of one or more of the components 102 (shown in FIG. 1). The control unit 112 recognizes the actions, and associates them with one or more operational functions of the components 102, as described herein.

Referring to FIGS. 1-12, a leftward swipe 500 through the channel 220 is an action detected by the sensing device(s) 106. A rightward swipe 502 through the channel 220 is another action detected by the sensing device(s) 106. A downward swipe 504 through the channel 222 is another action detected by the sensing device(s) 106. An upward swipe 506 is another action detected by the sensing device(s) 106. An orbit 506 around a protuberance, such as the protuberance 202b, is another action detected by the sensing device(s) 106. A poke 508 at various areas within the channels 220 and 222 is another action detected by the sensing device(s) 106.

Figure 13:
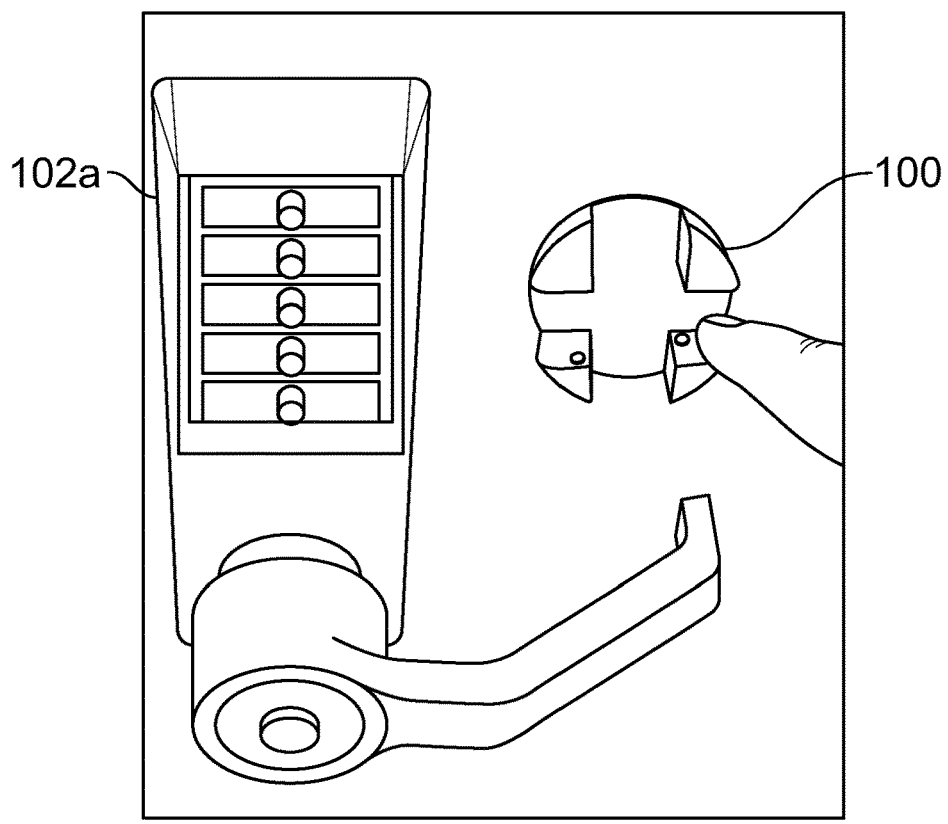
FIG. 13 illustrates a perspective front view of a sensor system coupled to a lock, according to an example of the present disclosure.

FIG. 13 illustrates a perspective front view of a sensor system 100 coupled to a lock 102a, according to an example of the present disclosure. The lock 102a is an example of a component. Different actions performed by an object, such as a finger, in relation to the sensor system 100 can be used as a combination to open the lock 102a. for example, instead of a sequence of presses on different buttons of the lock, a sequence of different actions (such as left swipe-down swipe-orbit protuberance 202d) can be used to pen the lock 102a.

Figure 14:
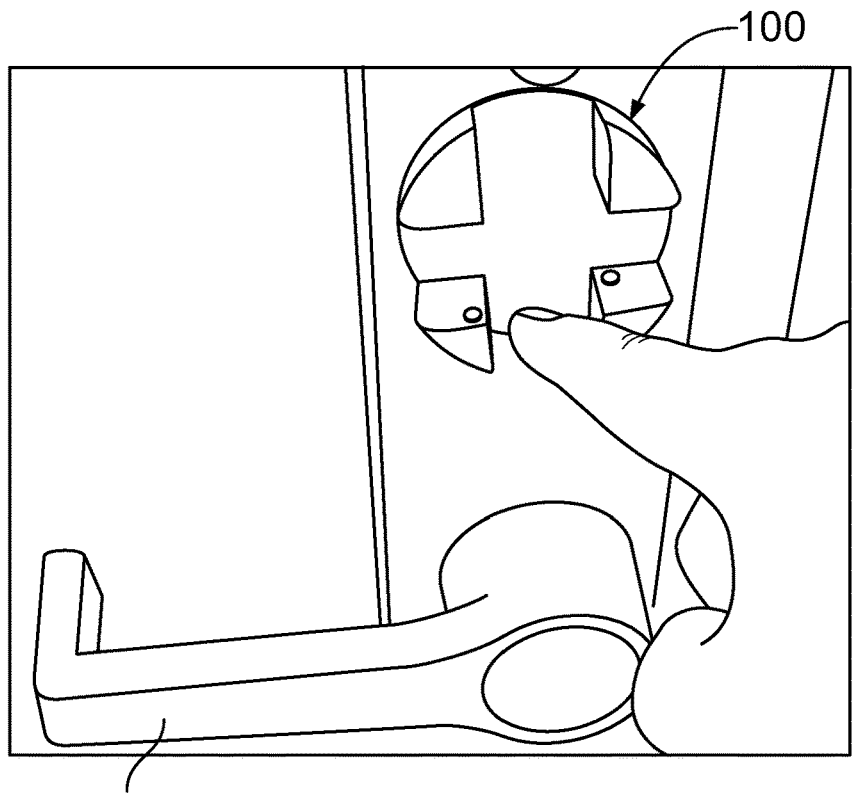
FIG. 14 illustrates a perspective front view of a sensor system coupled to a handle, according to an example of the present disclosure.

FIG. 14 illustrates a perspective front view of a sensor system 100 coupled to a handle 102b, according to an example of the present disclosure. The handle 102b is an example of a component. The sensor system 100 can be used to operate the handle 102b without the handle 102b being touched. For example, an action of an item in relation to the sensor system 100 can be used to move the handle 102b into an open position.

Figure 15:
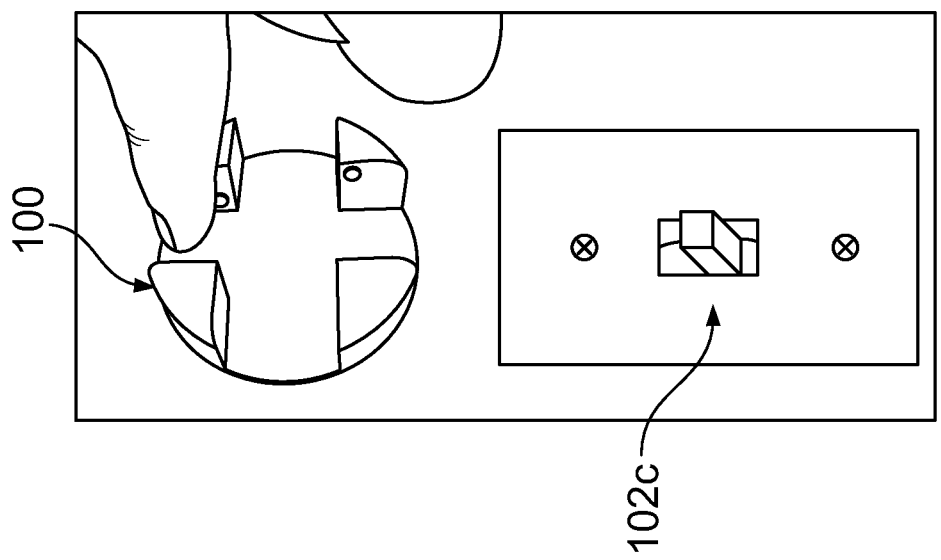
FIG. 15 illustrates a perspective front view of a sensor system coupled to a light switch, according to an example of the present disclosure.

FIG. 15 illustrates a perspective front view of a sensor system 100 coupled to a light switch 102c, according to an example of the present disclosure. The light switch 102c is an example of a component. The sensor system 100 can be used to operate the light switch 102c without the light switch 102c being touched. For example, an action of an item in relation to the sensor system 100 can be used to move the light switch 102c between ON and OFF positions.

Figure 16:
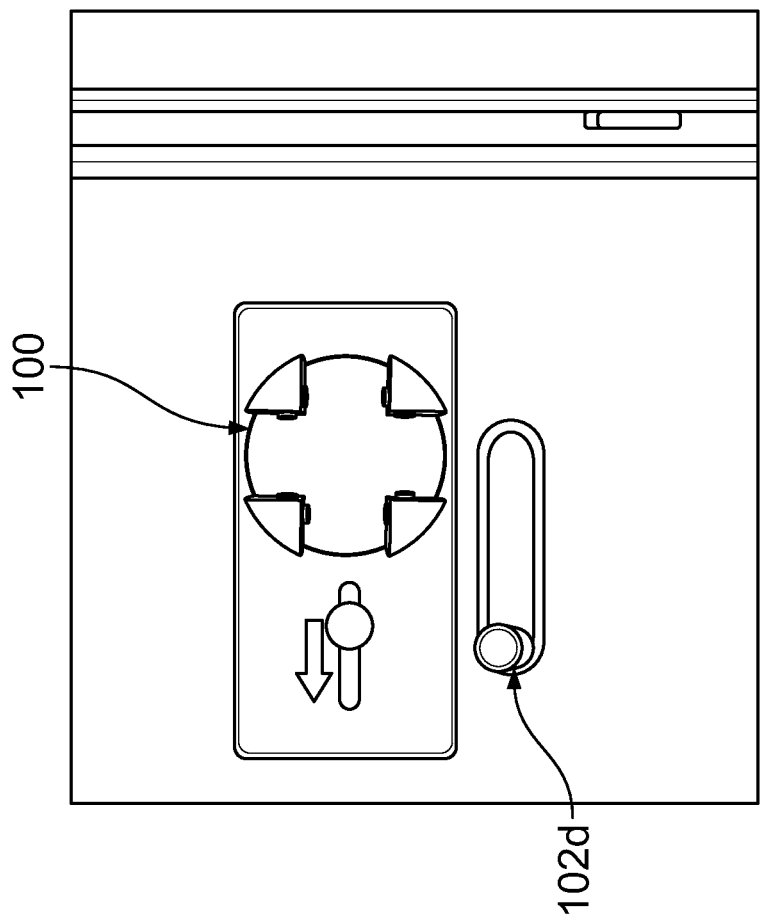
FIG. 16 illustrates a perspective front view of a sensor system coupled to a latch, according to an example of the present disclosure.

FIG. 16 illustrates a perspective front view of a sensor system 100 coupled to a latch 102d (such as that of a door), according to an example of the present disclosure. The latch 102d is an example of a component. The sensor system 100 can be used to operate the latch 102d without the latch 102d being touched. For example, an action of an item in relation to the sensor system 100 can be used to move the latch 102d between unlocked and locked positions.

Figure 17:
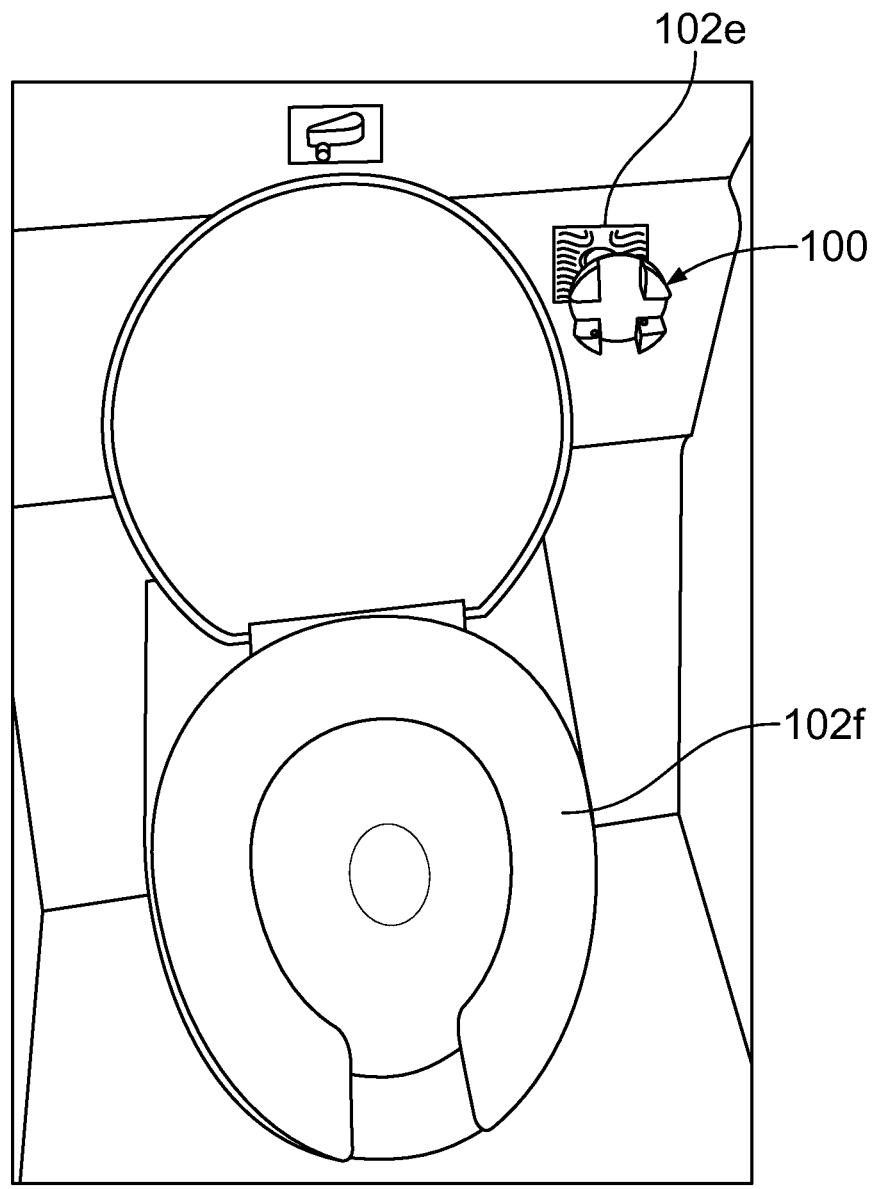
FIG. 17 illustrates a perspective front view of a sensor system coupled to a flush button of a toilet, according to an example of the present disclosure.

FIG. 17 illustrates a perspective front view of a sensor system 100 coupled to a flush button 102e of a toilet 102f, according to an example of the present disclosure. The flush button 102e and the toilet 102f are examples of a component. The sensor system 100 can be used to operate the flush button 102e and/or portions of the toilet 102f (such as actuator used to open and close a seat and/or a cover) without the flush button 102e and/or the toilet 102f being touched. For example, an action of an item in relation to the sensor system 100 can be used to move engage the flush button 102e to flush the toilet 102f.

Figure 18:
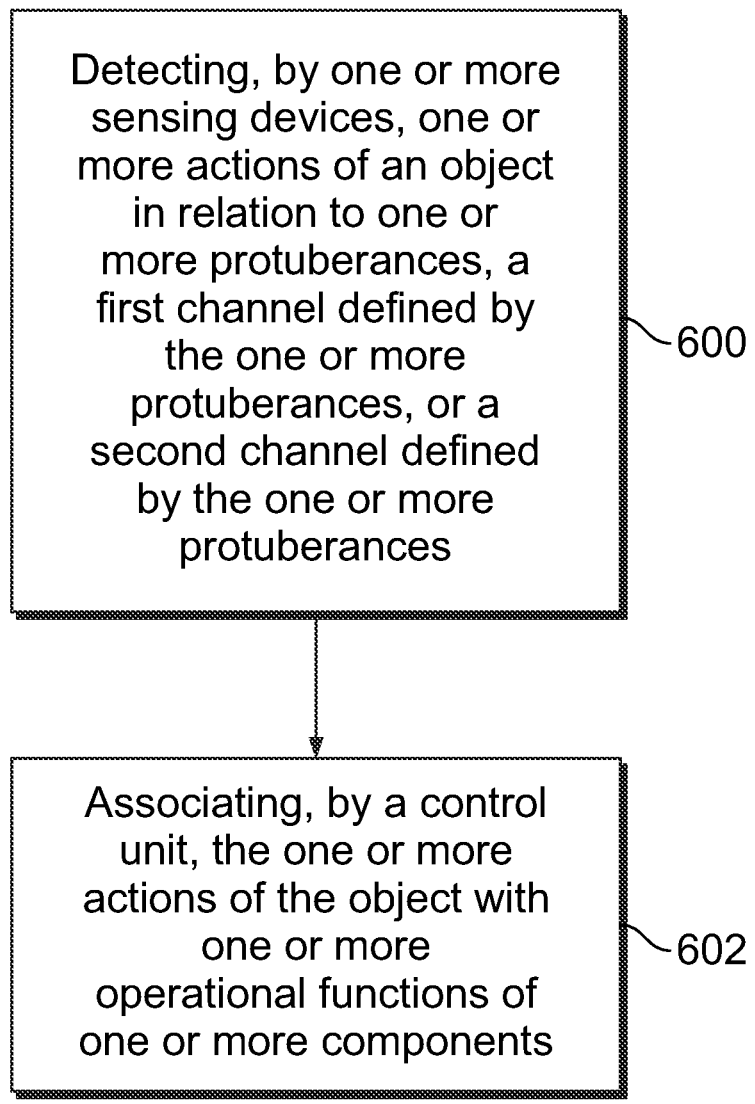
FIG. 18 illustrates a flow chart of a method of controlling one or more operational functions of one or more components, according to an example of the present disclosure.

FIG. 18 illustrates a flow chart of a method of controlling one or more operational functions of one or more components, according to an example of the present disclosure. The method includes detecting, at 600, by one or more sensing devices, one or more actions of an object in relation to one or more of one or more protuberances, a first channel defined by the one or more protuberances, or a second channel defined by the one or more protuberances; and associating, at 602, by a control unit, the one or more actions of the object with the one or more operational functions of the one or more components.

In at least one example, the method also includes detecting, by a camera, one or more distinguishable features of an individual.

In at least one example, the method also includes sensing, by one or more object depth sensors, a depth of an object within one or both of the first channel or the second channel.

Further, the disclosure comprises examples according to the following clauses:

Clause 1. A sensor system configured to control one or more operational functions of one or more components, the sensor system comprising:
one or more protuberances;
a first channel defined by the one or more protuberances;
a second channel defined by the one or more protuberances; and
one or more sensing devices configured to detect one or more actions of an object in relation to one or more of the one or more protuberances, the first channel, or the second channel, wherein the one or more actions of the object are associated with the one or more operational functions of the one or more components.

Clause 2. The sensor system of Clause 1, wherein the one or more sensing devices comprise:
an infrared emitter having at least a portion on the one or more protuberances; and
an infrared receiver having at least a portion on the one or more protuberances.

Clause 3. The sensor system of Clauses 1 or 2, wherein the one or more sensing devices comprises a camera.

Clause 4. The sensor system of Clause 3, wherein the camera is further configured to detect one or more distinguishable features of an individual.

Clause 5. The sensor system of any of Clauses 1-4, wherein the first channel intersects the second channel.

Clause 6. The sensor system of any of Clauses 1-5, wherein the first channel is orthogonal to the second channel.

Clause 7. The sensor system of any of Clauses 1-6, wherein the object is a finger, and wherein the first channel and the second channel are sized and shaped to receive the finger.

Clause 8. The sensor system of any of Clauses 1-7, wherein the one or more protuberances comprise four protuberances, and wherein the first channel and the second channel are defined between the four protuberances.

Clause 9. The sensor system of any of Clauses 1-8, wherein the sensor system is mounted on a structure.

Clause 10. The sensor system of any of Clauses 1-9, wherein the sensor system is integrally formed with a structure.

Clause 11. The sensor system of any of Clauses 1-10, wherein the one or more protuberances have at least a portion outwardly extending from a surface of a structure.

Clause 12. The sensor system of any of Clauses 1-11, further comprising one or more object depth sensors.

Clause 13. The sensor system of any of Clauses 1-12, wherein the one or more components comprise one or more of a lock, a handle, a light switch, a latch, or a flush button of a toilet.

Clause 14. A method of controlling one or more operational functions of one or more components, the method comprising:
detecting, by one or more sensing devices, one or more actions of an object in relation to one or more of one or more protuberances, a first channel defined by the one or more protuberances, or a second channel defined by the one or more protuberances; and
associating, by a control unit, the one or more actions of the object with the one or more operational functions of the one or more components.

Clause 15. The method of Clause 14, wherein the one or more sensing devices comprise:
an infrared emitter having at least a portion on the one or more protuberances; and
an infrared receiver having at least a portion on the one or more protuberances.

Clause 16. The method of Clauses 14 or 15, wherein the one or more sensing devices comprises a camera.

Clause 17. The method of Clause 16, further comprising detecting, by the camera, one or more distinguishable features of an individual.

Clause 18. The method of any of Clauses 14-17, wherein the first channel intersects the second channel, and wherein the first channel is orthogonal to the second channel.

Clause 19. The method of any of Clauses 14-18, further comprising sensing, by one or more object depth sensors, a depth of an object within one or both of the first channel or the second channel.

Clause 20. A system comprising:

one or more components; and a sensor system configured to control one or more operational functions of the one or more components, the sensor system comprising:

four protuberances;

a first channel defined by at least a first portion of the four protuberances;

a second channel defined by at least a second portion of the four protuberances; and one or more sensing devices configured to detect actions of an object in relation to the four protuberances, the first channel, and the second channel, wherein the actions of the object are associated with the one or more operational functions of the one or more components.

As described herein, examples of the present disclosure provide effective and reliable touchless sensors. Further, examples of the present disclosure provide touchless sensors that are less susceptible to inadvertent triggering, as compared to known touchless sensors. Also, examples of the present disclosure provide touchless sensors that can be used to operate various different modes or functions of various components.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A sensor system configured to control one or more operational functions of one or more components, the sensor system comprising:

a base having a first surface and a second surface opposite from the first surface;

a first protuberance extending from the first surface of the base, wherein the first protuberance has a first interior wall parallel to an X-axis, a second interior wall parallel to a Y-axis that is orthogonal to the X-axis, and a first exterior wall;

one or more first sensing devices coupled to the first protuberance;

a second protuberance extending from the first surface of the base, wherein the second protuberance has a third interior wall parallel to the X-axis, a fourth interior wall parallel to the Y-axis that is orthogonal to the X-axis, and a second exterior wall;

one or more second sensing devices coupled to the second protuberance;

a third protuberance extending from the first surface of the base, wherein the third protuberance has a fifth interior wall parallel to the X-axis, a sixth interior wall parallel to the Y-axis that is orthogonal to the X-axis, and a third exterior wall;

one or more third sensing devices coupled to the third protuberance;

a fourth protuberance extending from the first surface of the base, wherein the fourth protuberance has a seventh interior wall parallel to the X-axis, an eighth interior wall parallel to the Y-axis that is orthogonal to the X-axis, and a fourth exterior wall;

one or more fourth sensing devices coupled to the fourth protuberance;

a first channel defined between the first protuberance, the second protuberance, the third protuberance, and the fourth protuberance, wherein the first channel is parallel to the X-axis; and a second channel defined between the first protuberance, the second protuberance, the third protuberance, and the fourth protuberance, wherein the second channel is parallel to the Y-axis and intersects the first channel, wherein the one or more first sensing devices, the one or more second sensing devices, the one or more third sensing devices, and the one or more fourth sensing devices are configured to detect one or more actions of an object in relation to one or more of the first protuberance, the second protuberance, the third protuberance, the fourth protuberance, the first channel, or the second channel, wherein the one or more actions of the object are associated with the one or more operational functions of the one or more components.

2. The sensor system of claim 1, wherein the one or more first sensing devices, the one or more second sensing devices, the one or more third sensing devices, and the one or more fourth sensing devices comprise:
an infrared emitter having at least a portion on one or more of the first protuberance, the second protuberance, the third protuberance, or the fourth protuberance; and
an infrared receiver having at least a portion one or more of on the first protuberance, the second protuberance, the third protuberance, or the fourth protuberance.

3. The sensor system of claim 1, wherein one or more of the one or more first sensing devices, the one or more second sensing devices, the one or more third sensing devices, or the one or more third sensing devices comprise a camera.

4. The sensor system of claim 3, wherein the camera is further configured to detect one or more distinguishable features of an individual.

5. The sensor system of claim 1, wherein the object is a finger, and wherein the first channel and the second channel are sized and shaped to receive the finger.

6. The sensor system of claim 1, wherein the sensor system is mounted on a structure.

7. The sensor system of claim 1, wherein the sensor system is integrally formed with a structure.

8. The sensor system of claim 1, wherein the base, the first protuberance, the second protuberance, the third protuberance, and the fourth protuberance outwardly extend from a surface of a structure.

9. The sensor system of claim 1, further comprising one or more object depth sensors.

10. The sensor system of claim 1, wherein the one or more components comprise one or more of a lock, a handle, a light switch, a latch, or a flush button of a toilet.

11. The sensor system of claim 1, wherein the one or more first sensing devices comprise a first infrared emitter and a first infrared receiver, wherein the one or more second sensing devices comprise a second infrared emitter and a second infrared receiver, wherein the one or more third sensing devices comprise a third infrared emitter and a third infrared receiver, and wherein the one or more fourth sensing devices comprise a fourth infrared emitter and a fourth infrared receiver.

12. The sensor system of claim 11, wherein each of the first infrared emitter, the second infrared emitter, the third infrared emitter, and the fourth infrared emitter is upwardly angled.

13. The sensors system of claim 1, wherein each of the first surface of the base, the first interior wall, the second interior wall, the third interior wall, the fourth interior wall, the fifth interior wall, the sixth interior wall, the seventh interior wall, and the eighth interior wall is flat.

14. A method for a sensor system configured to control one or more operational functions of one or more components, the sensor system comprising:
a base having a first surface and a second surface opposite from the first surface;
a first protuberance extending from the first surface of the base, wherein the first protuberance has a first interior wall parallel to an X-axis, a second interior wall parallel to a Y-axis that is orthogonal to the X-axis, and a first exterior wall;
one or more first sensing devices coupled to the first protuberance;
a second protuberance extending from the first surface of the base, wherein the second protuberance has a third interior wall parallel to the X-axis, a fourth interior wall parallel to the
Y-axis that is orthogonal to the X-axis, and a second exterior wall;
one or more second sensing devices coupled to the second protuberance;
a third protuberance extending from the first surface of the base, wherein the third protuberance has a fifth interior wall parallel to the X-axis, a sixth interior wall parallel to the Y-axis that is orthogonal to the X-axis, and a third exterior wall;
one or more third sensing devices coupled to the third protuberance;
a fourth protuberance extending from the first surface of the base, wherein the fourth protuberance has a seventh interior wall parallel to the X-axis, an eighth interior wall parallel to the Y-axis that is orthogonal to the X-axis, and a fourth exterior wall;
one or more fourth sensing devices coupled to the fourth protuberance;
a first channel defined between the first protuberance, the second protuberance, the third protuberance, and the fourth protuberance, wherein the first channel is parallel to the X-axis; and
a second channel defined between the first protuberance, the second protuberance, the third protuberance, and the fourth protuberance, wherein the second channel is parallel to the Y-axis and intersects the first channel,
wherein the one or more first sensing devices, the one or more second sensing devices, the one or more third sensing devices, and the one or more fourth sensing devices are configured to detect one or more actions of an object in relation to one or more of the first protuberance, the second protuberance, the third protuberance, the fourth protuberance, the first channel, or the second channel, wherein the one or more actions of the object are associated with the one or more operational functions of the one or more components,
the method comprising:
detecting, by the one or more first sensing devices, the one or more second sensing devices, the one or more third sensing devices, and the one or more fourth sensing devices coupled to a fourth protuberance extending from the base, the one or more actions of the object in relation to one or more of the first protuberance, the second protuberance, the third protuberance, the fourth protuberance, the first channel, or the second channel; and
associating, by the control unit, the one or more actions of the object with the one or more operational functions of the one or more components.

15. The method of claim 14, wherein the one or more first sensing devices, the one or more second sensing devices, the one or more third sensing devices, and the one or more fourth sensing devices comprise:
an infrared emitter having at least a portion on one or more of the one or more first protuberances, the one or more second protuberances, the one or more third protuberances, or the one or more fourth protuberances; and
an infrared receiver having at least a portion on one or more of the one or more first protuberances, the one or more second protuberances, the one or more third protuberances, or the one or more fourth protuberances.

16. The method of claim 14, wherein one or more of the one or more first sensing devices, the one or more second sensing devices, the one or more third sensing devices, or the one or more fourth sensing devices comprise a camera.

17. The method of claim 16, further comprising detecting, by the camera, one or more distinguishable features of an individual.

18. The method of claim 14, wherein the first channel intersects the second channel, and wherein the first channel is orthogonal to the second channel.

19. The method of claim 14, further comprising sensing, by one or more object depth sensors, a depth of an object within one or both of the first channel or the second channel.

20. A system comprising:
one or more components; and
a sensor system configured to control one or more operational functions of the one or more components, the sensor system comprising:
a base having a first surface and a second surface opposite from the first surface;
a first protuberance extending from the first surface of the base, wherein the first protuberance has a first interior wall parallel to an X-axis, a second interior wall parallel to a Y-axis that is orthogonal to the X-axis, and a first exterior wall;
one or more first sensing devices coupled to the first protuberance;
a second protuberance extending from the first surface of the base, wherein the second protuberance has a third interior wall parallel to the X-axis, a fourth interior wall parallel to the Y-axis that is orthogonal to the X-axis, and a second exterior wall; one or more second sensing devices coupled to the second protuberance;
a third protuberance extending from the first surface of the base, wherein the third protuberance has a fifth interior wall parallel to the X-axis, a sixth interior wall parallel to the Y-axis that is orthogonal to the X-axis, and a third exterior wall;
one or more third sensing devices coupled to the third protuberance;
a fourth protuberance extending from the first surface of the base, wherein the fourth protuberance has a seventh interior wall parallel to the X-axis, an eighth interior wall parallel to the Y-axis that is orthogonal to the X-axis, and a fourth exterior wall;
one or more fourth sensing devices coupled to the fourth protuberance;
a first channel defined between the first protuberance, the second protuberance, the third protuberance, and the fourth protuberance, wherein the first channel is parallel to the X-axis; and
a second channel defined between the first protuberance, the second protuberance, the third protuberance, and the fourth protuberance, wherein the second channel is parallel to the Y-axis and intersects the first channel,
wherein the one or more first sensing devices, the one or more second sensing devices, the one or more third sensing devices, and the one or more fourth sensing devices are configured to detect one or more actions of an object in relation to one or more of the first protuberance, the second protuberance, the third protuberance, the fourth protuberance, the first channel, or the second channel, wherein the one or more actions of the object are associated with the one or more operational functions of the one or more components.

* * * * *